United States Patent Office 3,634,398
Patented Jan. 11, 1972

3,634,398
β-AZIRIDINYLLACTAMIDES AND THEIR PRODUCTION
Friedrich Becke, Heidelberg, and Bruno Sander, Ludwigshafen, Germany, assignors to Badische Anilin- & Soda-Fabrik AG, Ludwigshafen (Rhine), Germany
No Drawing. Filed May 9, 1969, Ser. No. 823,473
Claims priority, application Germany, May 11, 1968, P 17 70 390.1
Int. Cl. C07d 23/02, 23/06
U.S. Cl. 260—239 E                     11 Claims

ABSTRACT OF THE DISCLOSURE

Production of β-aziridinyllactamides by reaction of aziridines with α,β-epoxypropionamides, and the new β-aziridinyllactamides themselves. The products are valuable starting materials for the production of textile and paper auxiliaries.

---

This invention relates to the production of β-aziridinyllactamides by reaction of aziridines with α,β-epoxypropionamides, and to the new substances obtained.

It is known that ethylenimine can be reacted in the presence of water with ethylene oxide at from 0° to 5° C. and with epoxides at about 100° C. to form hydroxyimino compounds (Houben-Weyl, Methoden der Organischen Chemie, volume 11/2, page 246). The reaction of aziridines with α,β-epoxypropionamides has not yet been described.

It is an object of this invention to provide a new method of producing β-aziridinyllactamides in good yields and high purity which is easy to carry out.

Another object of this invention is the new β-aziridinyllactamides.

These and other objects are achieved and β-aziridinyllactamides having the general formula:

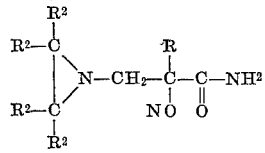

where $R^1$ denotes a hydrogen atom or an aliphatic radical, the radicals $R^2$ may be identical or different and each denotes a hydrogen atom or an aliphatic, cycloaliphatic, araliphatic or aromatic radical are obtained advantageously by reacting an aziridine having the general formula:

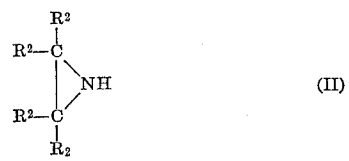

where $R^2$ has the above meanings with an α,β-epoxypropionamide having the general formula:

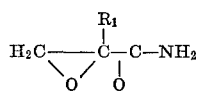

where $R^1$ has the above meanings, in the presence of water at a temperature below 20° C., then adding an organic solvent which is inert under the reaction conditions and completing the reaction at a temperature of from 0° to 60° C.

When 2-methylaziridine and α,β-epoxypropionamide are used, the reaction may be represented by the following equation:

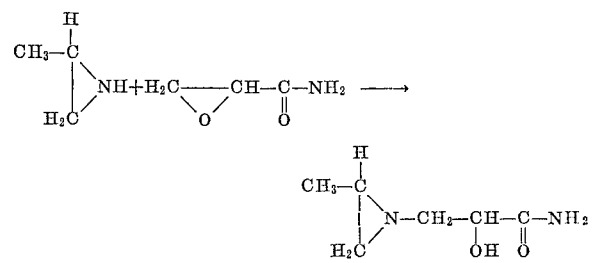

Having regard to the state of the art it is surprising that the process according to this invention should give β-aziridinyllactamides in good yields and high purity in a simple manner.

The starting materials may be used in purified form or in the form of their aqueous solutions which have not been purified and which are obtained in the manufacture of the starting materials. The end products are generally obtained so pure that additional purification operations can be dispensed with. This advantageous result is surprising because the formation of difficultly separable mixtures of polymers would have been expected having regard to the fact that both the starting materials and the end products are readily polymerizable. Such polymerizations are observed when the procedure of the abovementioned prior art methods is transferred to the reaction of aziridines with α,β-epoxypropionamides.

Preferred starting aziridines (II) and consequently preferred end products (I) are those in whose formulae the radicals $R^2$ are identical or different and each denotes a hydrogen atom or an alkyl, cycloalkyl, aralkyl or aryl radical having in each case up to ten, particularly up to seven carbon atoms. For example the following aziridines may be used as starting materials (II): ethylenimine, 2-methylethylenimine, 2-ethylethylenimine, 2,2-dimethylethylenimine, 2,3-dimethylethylenimine, 2-cyclohexylethylenimine, 2-phenylethylenimine and 2-benzyl-3-methylethylenimine.

The starting material (II) is reacted with an α,β-epoxypropionamide (glycidamine) having the general Formula III (which may be prepared for example by reaction of the corresponding nitrile with hydrogen peroxide) in a stoichiometric amount or advantageously with an excess of starting material (II), for example in a molar ratio of from 1.1 to 2 moles of starting material (II) to 1 mole of starting material (III). Preferred starting materials (III) and consequently preferred end products (I) are those in whose formulae $R^1$ denotes a hydrogen atom or an alkyl radical having from one to eight carbon atoms. Examples of suitable starting materials (III) are: α,β-epoxypropionamide and its α-methyl, α-ethyl and α-butyl compounds.

The starting materials are reacted in the presence of water. For example one or both of the starting materials may be dissolved in water or mixed with water. The amount of water may be varied within wide limits; for example the amount of water may be from 1 to 80%, particularly from 5 to 20%, by weight with reference to the total weight of starting materials (II) and (III). The starting materials may also be used in the form of their unpurified aqueous solutions such as are obtained in their production. Starting material (II) and water are preferably placed in a vessel in a molar ratio of 1.1 to 2 moles of each per mole of starting material (III) and the starting material (III) is added slowly, for example during one to sixty, advantageously five to thirty, minutes in the form of from 50 to 95% by weight aqueous solution while mixing well. The temperature of the reaction mixture being formed is kept below 20°, preferably below 10° C., during the addition, generally by efficient cooling.

Reaction begins during the addition of one starting material to the other, and this is indicated by the heat of reaction liberated and in some cases by the end product beginning to crystallize. When all has been added, an organic solvent which is inert under the reaction conditions is added to the reaction mixture. The solvent may be added immediately after the starting materials have been mixed, but some time, generally from ten to sixty minutes, may be allowed to elapse in order to achieve more complete reaction of the starting materials with one another before the solvent is added. The solvent is advantageously added when the temperature of the reaction mixture, in spite of efficient cooling, rises above the said mixing temperature or the end product begins to crystallize from the reaction mixture. It is advantageous to add the solvent all at once and within a short period, for example from one to fifteen minutes. The amount of solvent used may be varied within a wide range and it is advantageous to use from 50 to 70% by volume with reference to the volume of the reaction mixture. Examples of suitable solvents are: ketones such as acetone, methyl ethyl ketone, hexanone-(2), acetylacetone and cyclohexanone; cyclic ethers such as 1,4-dioxane, 1,3-dioxolane and tetrahydrofuran; pentamethylene oxide, hexamethylene oxide, 1,3-dioxacyclo-heptane and diglycol formal.

After the solvent has been added, the temperature of the reaction mixture is kept at from 0° to 60° C., preferably from 10° to 30° C., and the reaction is generally over within thirty minutes to two hours. The end product is then separated in the usual way, for example by filtering off the crystalline precipitate formed and washing the filtered material, preferably with the solvent used in the reaction.

The reaction can be carried out at atmospheric pressure, continuously or batchwise.

The new compounds obtainable according to the process are valuable starting materials for the production of textile and paper auxiliaries. For example, it is possible to make from the products, by methylolation, textile auxiliaries, for example for the crease resistant finishing of cotton, shrinkproof and swellproof finishing of rayon staple fiber, stiffening of cellulose fabrics, and by copolymerization of the end products with aziridines to prepare modified polyalkylenimines which are suitable as paper auxiliaries.

Paper or pulp may be for example impregnated with the polyalkylenimines thus prepared in an amount of from 1 to 20 grams per kilogram of cellulose and dried, so that wet-resistant, low swelling filter papers or artificial leather materials are obtained. Similarly, cotton cloth may be impregnated from aqueous solution, for example at the rate of 50 to 150 grams per kilogram of fibrous material with a methylol compound obtained by reacting the end product with formaldehyde in the ratio 1:2. After the cloth has been dried and condensed in a condensation unit at from 120° to 160° C., crease resist cotton cloth having a pleasant handle is obtained. The new compounds are moreover suitable for stabilizing polyacetals.

The invention is illustrated by the following examples. The parts specified in the examples are parts by weight.

EXAMPLE 1

516 parts of ethylenimine and 80 parts of water are cooled to 10° C. in a stirred vessel. Then with stirring and intense external cooling, a solution of 870 parts of glycidamide in 100 parts of water is introduced in the course of thirty minutes. Ten minutes later the temperature rises to 30° C. in spite of the external cooling and crystals begin to separate. The reaction mixture is then diluted in the course of two minutes with 1000 parts of acetone. The reaction mixture is then stirred for another thirty minutes at 25° C.

The colorless crystalline precipitate is filtered off and washed with ice-cold acetone. 1195 parts of β - ethylenimiolactamide is obtained having a melting point of from 155° to 157° C., i.e. a yield of 92% of the theory with reference to glycidamide used. The empirical formula is $C_5H_{10}N_2O_2$ (135.15).

Analytical values.—Calculated (percent): C, 46.1; H, 7.8; N, 21.5; O, 24.6. Found (percent): C, 46.0; H, 7.9; H, 21.2; O, 24.2.

EXAMPLE 2

684 parts of 2-methylethylenimine and 100 parts of water are cooled to 10° C. While stirring and cooling intensely externally, a solution of 870 parts of glycidamide in 100 parts of water is added within ten minutes. When crystals begin to separate (after twenty minutes) the reaction mixture is diluted with 1000 parts of 1,4-dioxane, The mixture is kept at 25° C. for two hours. The deposited colorless crystals are filtered off and washed with ice-cold acetone. 1350 parts of β-(2-methyl)-ethylenimonolactamide is obtained having a melting point of 151° to 155° C., i.e. a yield of 93.5% of the theory with reference to glycidamide used.

Empirical formula: $C_6H_{12}H_2O_2$ (144.17).

Analytical values.—Calculated (percent): C, 50.0; H, 8.4; N, 19.4; O, 22.2. Found (percent): C, 49.9; H, 8.5; N, 19.3; O, 21.9.

What we claim is:

1. A β-aziridinyllactamide having the formula:

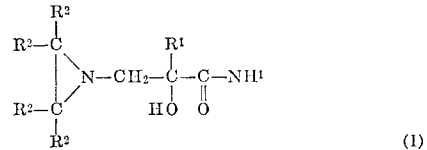

(1)

where $R^1$ denotes a hydrogen atom or alkyl having 1–8 carbon atoms and $R^2$ respectively denote a hydrogen atom or an alkyl, cycloalkyl, aralkyl or aryl group respectively having up to ten carbon atoms.

2. A process for the production of β-aziridinyllactamides having the formula

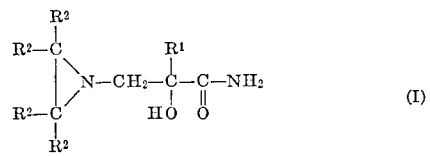

(I)

where $R^1$ denotes a hydrogen atom or alkyl having 1–8 carbon atoms and $R^2$ respectively denote a hydrogen atom or an alkyl, cycloalkyl, aralkyl or aryl group respectively having up to ten carbon atoms, wherein an aziridine having the formula:

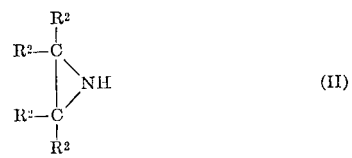

(II)

where $R^2$ has the above meanings, is reacted with an α,β-epoxypropionamide having the formula:

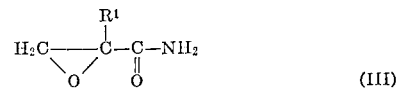

(III)

where $R^1$ has the above meanings, in the presence of water at a temperature of less than 20° C., then an organic solvent which is inert under the reaction conditions is added and the reaction is completed at a temperature of from 0° to 60° C.

3. A process as claimed in claim 2 wherein the starting materials are reacted in a molar ratio of from 1.1 to 2 moles of starting material (II) to 1 mole of starting material (III).

4. A process as claimed in claim 2 wherein the reaction is carried out in the presence of water in an amount of from 1 to 80% by weight with reference to the total weight of starting materials (II) and (III).

5. A process as claimed in claim 2 wherein the reaction is carried out in the presence of water in an amount of from 5 to 20% by weight with reference to the total weight of starting materials (II) and (III).

6. A process as claimed in claim 2 wherein the reaction is carried out at a temperature below 10° C.

7. A process as claimed in claim 2 wherein the solvent is added within from one to fifteen minutes in an amount of from 50 to 70% by volume with reference to the volume of the reaction mixture.

8. A process as claimed in claim 2 wherein the reaction is carried to completion at from 10° to 30° C.

9. A β-aziridinyllacetamide as claimed in claim 1 wherein one of the radicals $R^2$ is hydrogen, methyl, ethyl, cyclohexyl, phenyl or benzyl, another radical $R^2$ is hydrogen or methyl and the remaining radicals $R^2$ are hydrogen.

10. A β-aziridinyllactamide as claimed in claim 1 wherein $R^1$ and all radicals $R^2$ are hydrogen.

11. A β-aziridinyllactamide as claimed in claim 1 wherein $R^1$ is hydrogen, one of the radicals $R^2$ is methyl and the remaining radicals $R^2$ are hydrogen.

References Cited

Funke et al., Bull. Soc. Chim. France, 1953, pp. 1021–1023.

Weissberger, Heterocyclic Compounds, vol. 19, part 1 (Interscience, 1964), p. 544.

ALTON D. ROLLINS, Primary Examiner

U.S. Cl. X.R.

8—116.2; 117—139.4, 139.5 CQ; 162—164; 260—2 EN, 348 A

PO-1050
(5/69)

UNITED STATES PATENT OFFICE
CERTIFICATE OF CORRECTION

Patent No. 3,634,398      Dated January 11, 1972

Inventor(s) Friedrich Becke and Bruno Sander

It is certified that error appears in the above-identified patent and that said Letters Patent are hereby corrected as shown below:

Column 1, line 40, that portion of the formula reading "R" should read -- $R^1$ --; lines 60-64, " 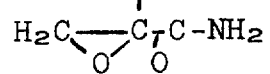 " should read -- 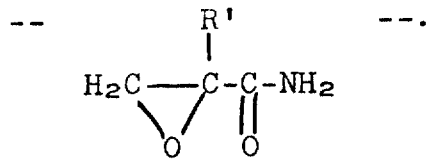 --.

Column 2, line 69, "of from" should read -- of a from --.

Column 3, line 40, "resistent" should read -- resistant --.

Column 4, line 30, that portion of the formula reading "$NH^1$" should read -- $NH_2$ --.

Signed and sealed this 12th day of September 1972.

(SEAL)
Attest:

EDWARD M. FLETCHER, JR.
Attesting Officer

ROBERT GOTTSCHALK
Commissioner of Patents